UNITED STATES PATENT OFFICE.

DAVID S. PRATT AND CHARLES W. TRIGG, OF PITTSBURGH, PENNSYLVANIA, ASSIGNORS TO JOHN E. KING, OF DETROIT, MICHIGAN.

METHOD OF ADDING SEGREGATED AROMAS TO COFFEE EXTRACT.

1,367,716.     Specification of Letters Patent.     Patented Feb. 8, 1921.

No Drawing.     Application filed May 31, 1918. Serial No. 237,569.

*To all whom it may concern:*

Be it known that we, DAVID S. PRATT and CHARLES W. TRIGG, citizens of the United States, residing at Pittsburgh, in the county of Allegheny and State of Pennsylvania, have invented a new and useful Improvement in Methods of Adding Segregated Aromas to Coffee Extract, of which the following is a specification.

In the art of preparing coffee-extracts it has already been proposed to separate aromas or caffeol contained in a condensate by means of volatile solvents. It has also been proposed to add this volatile solvent containing the caffeol or coffee aroma to the coffee-extract, especially to dry powdered extract from which tablets soluble in water are to be made. No adequate means have ever been heretofore revealed for successfully effecting this addition.

Our discovery consists of a process for adding the caffeol contained in a solvent to the coffee-extract in such a way as to get the best possible results. This we accomplish by reducing the coffee-extract to a dry powder, which is spread out in a thin layer. Upon this thin layer of dry powdered extract the volatile solvent containing the caffeol is sprayed in a fine spray. The spreading out of the dry powdered coffee-extract in a thin layer allows the volatile solvent to evaporate very rapidly, leaving the caffeol absorbed in the dry coffee-extract. This rapid evaporation of the solvent is advantageous for the reason that the solvent evaporates so quickly that the caffeol is not carried along with it and at the same time the extract is not dampened. The evaporation of the solvent produces a cooling effect upon the extract which tends to lower the rate of volatilization of the fugacious caffeol.

The evaporation of the solvent may be assisted by passing a current of gas over the extract. The gas should preferably contain no free oxygen, thus avoiding oxidation of the coffee-extract during the procedure.

Some caffeol will be carried away by the volatile solvent but the majority of this may be recovered with the solvent by subjecting the offgoing gases to refrigeration or compression or both. The solvent is then re-used so that no loss of caffeol occurs.

There may be used with the dry powdered coffee-extract some other ingredient whose characteristics aside from aroma catching and retaining are substantially neutral. Such an ingredient is milk sugar or lactose, which we have referred to in a co-pending application.

What we claim is:

1. In a process for preparing water-soluble coffee-extract, the addition of the coffee aroma to the extract, which consists in spraying a volatile solvent containing the aroma onto a thin layer of the extract.

2. In preparing a water-soluble coffee-extract, the addition of the aroma to the extract, which consists in spraying a volatile solvent containing the aroma upon a thin layer of dry powdered coffee-extract.

3. In preparing a water-soluble coffee-extract, the spraying of a volatile solvent solution of aroma upon the coffee-extract.

4. In preparing a water-soluble coffee-extract, the saturation of the same with caffeol by spraying a solution of caffeol upon the coffee-extract.

5. In a process for preparing water-soluble coffee-extract, the addition of the coffee aroma to the extract by spraying a volatile solvent containing the aroma onto a thin layer of the dry powdered coffee-extract, and the passing of a current of gas over the extract to facilitate the evaporation of the solvent.

6. In preparing a water-soluble coffee-extract, the spraying of a volatile solvent containing the aroma onto a thin layer of dry coffee-extract, and the passing of a current of neutral gas over the extract to facilitate the evaporation of the solvent.

In witness whereof we have hereunto set our hands on the 24th day of May, 1918.

DAVID S. PRATT.
CHARLES W. TRIGG.